(12) United States Patent
Park

(10) Patent No.: US 7,727,637 B2
(45) Date of Patent: Jun. 1, 2010

(54) STRUCTURE OF COATING LAYER FOR HEAT-COOKER

(75) Inventor: Chung Kwon Park, Busan (KR)

(73) Assignee: Thermolon Korea Co., Ltd, Busan (KR)

(*) Notice: Subject to any disclaimer, the term of this patent is extended or adjusted under 35 U.S.C. 154(b) by 90 days.

(21) Appl. No.: 11/797,482

(22) Filed: May 3, 2007

(65) Prior Publication Data
US 2008/0017074 A1      Jan. 24, 2008

(30) Foreign Application Priority Data
Jul. 18, 2006   (KR) ...................... 10-2006-0066739

(51) Int. Cl.
*B32B 15/04* (2006.01)
*C09C 1/64* (2006.01)
(52) U.S. Cl. .................. 428/472.2; 428/447; 428/448; 428/446; 99/339; 126/506; 220/592.01; 220/592.22; 106/404
(58) Field of Classification Search .................. None
See application file for complete search history.

(56) References Cited

U.S. PATENT DOCUMENTS

| | | | |
|---|---|---|---|
| 4,564,001 A | | 1/1986 | Maeda ................. 126/390 |
| 5,432,007 A | * | 7/1995 | Naito ................... 428/447 |
| 6,077,341 A | * | 6/2000 | Terase et al. ........... 106/482 |
| 2001/0003358 A1 | * | 6/2001 | Terase et al. .......... 252/62 |
| 2004/0229044 A1 | * | 11/2004 | Goto ..................... 428/421 |
| 2004/0253463 A1 | * | 12/2004 | Inui et al. .............. 428/448 |
| 2005/0042463 A1 | * | 2/2005 | Anderson et al. ........ 428/447 |

FOREIGN PATENT DOCUMENTS

| | | | |
|---|---|---|---|
| CA | 2257771 | | 1/1999 |
| JP | 11-253315 | | 9/1999 |
| KR | 20-0206737 | | 12/2000 |
| KR | 20-0209057 | | 1/2001 |
| WO | WO2005075068 | * | 8/2005 |

OTHER PUBLICATIONS

International Search Report for PCT/KR2007/002130 mailed on Aug. 6, 2007, 3 pages.
Written Opinion of the International Searching Authority for PCT/KR2007/002130 dated Aug. 3, 2007, 4 pages.

* cited by examiner

*Primary Examiner*—Jennifer McNeil
*Assistant Examiner*—Vera Katz
(74) *Attorney, Agent, or Firm*—John K. Park; Park Law Firm

(57) ABSTRACT

The present invention relates to a coating layer structure for heat-cookers, and more particularly, to a coating layer structure for heat-cookers wherein said structure has been produced by forming an aluminum oxide ($Al_2O_3$) layer on the surface of an aluminum heat-cooker by anodic oxidation and then applying thereon either an anion- and far infrared ray-emitting, inorganic ceramic coating agent or a non-stick, inorganic ceramic coating agent, said both coating agents being non-toxic to human body, and whereby said structure, on heating, does not release any carcinogens and increases heat conductivity at the same time, and said structure also has excellent anti-corrosive and anti-abrasive properties.

2 Claims, 2 Drawing Sheets

STRUCTURE OF COATING LAYER FOR HEAT-COOKER

BACKGROUND OF THE INVENTION

1. Field of the Invention

The present invention relates to a coating layer structure for heat-cookers, and more particularly, to a coating layer structure for heat-cookers wherein said structure has been produced by forming an aluminum oxide ($Al_2O_3$) layer on the surface of an aluminum heat-cooker by anodic oxidation and then applying thereon either an anion- and far infrared ray-emitting, inorganic ceramic coating agent or a non-stick, inorganic ceramic coating agent, said both coating agents being non-toxic to human body, and whereby said structure, on heating, does not release any carcinogens and increases heat conductivity at the same time, and said structure also has excellent anti-corrosive and anti-abrasive properties.

2. Description of the Related Art

Generally, an aluminum heat-cooker may take a variety of forms, although for its washability and for preventing food from adhering thereto during cooking, it is used in such a form that the surface to be coated is endowed with roughness by sandblasting to increase the surface area and then is painted with Teflon and the like. However, the production of fine pin holes is inevitable during the Teflon painting, which leads to a problem that aluminum erodes through pin holes, and the like when cooking or maintaining salt-containing, acidic or alkaline food.

Also, in order to resolve the above problem, Korean Registered Utility Model No. 206737 (registration date: May 24, 2000) provides an aluminum cooker, on the surface of which aluminum oxide film layer and Teflon coating layer are formed sequentially wherein the former is formed by anodic oxidation (anodizing), thereby providing such advantages as enhanced adhesive strength between the surface of the cooker and the Teflon coating layer and prevention of food from adhering to the surface. However, in terms of the weakness of the surface strength of said Teflon itself, such cooker loses its original function at an earlier stage because of surface abrasions and scratches, and the like due to the frequent use of a spoon or a metallic spatula, and the like by the nature of a heat-cooker. Also, as it has recently been known that carcinogens are released from Teflon, the use of cookers coated with Teflon is being avoided.

Especially, the U.S. Environmental Protection Agency (EPA) has requested manufacturers to stop producing perfluorooctanoic acid (PFOA), a material used to make Teflon which is used as a coating agent for a frying pan, and the like. Along with such request to stop producing PFOA by 2015, the EPA has first requested eight general chemical companies including Dupont and 3M to reduce the use of said material by 95% by 2010. Dupont has already announced that they would accept this request. Accordingly, there is an enormous need for aluminum heat-cookers, on the surface of which an alternative coating layer is formed, wherein said coating layer is non-toxic to human body, prevents food from adhering thereto and shows a good heat conductivity.

SUMMARY OF THE INVENTION

The purpose of the present invention is to meet the above-mentioned need, and such purpose is achieved by providing an aluminum heat-cooker having a coating layer which is non-toxic to human body and has a good heat conductivity such that food is evenly cooked, said coating layer also having an extremely strong surface strength such that even when a spoon or a metallic spatula, and the like is used, no abrasions and scratches occur and thus the shelf-life of said cooker can be extended, wherein said coating layer is produced by forming an aluminum oxide film layer on the surface of an aluminum heat-cooker by anodic oxidation and then applying thereon either an anion- and far infrared ray-emitting, inorganic ceramic coating agent or a non-stick, inorganic ceramic coating agent, said both coating agents releasing no carcinogens and being environmentally-friendly.

The present invention provides an aluminum heat-cooker having a corrugated pattern formed on the inner surface of the body of said cooker wherein an aluminum oxide layer is formed on said corrugated pattern by anodic oxidation, characterized in that an anion- and far infrared ray-emitting, inorganic ceramic coating layer is formed on said aluminum oxide layer and said coating layer comprises n admixture the following components: 40-50 wt % of a binding agent, which is silane or an oligomer derived therefrom, as a binder; 27-34 wt % of a silicon mixture which chemically binds said silane or an oligomer derived therefrom as a binding agent and consists of a mixture of 20-40 wt % of powdered silicon oxide having the particle size of 0.1-1.2 μm and 60-80 wt % of water; 10-19 wt % of powdered functional filler which prevents the crack of a film between said binding agent and said silicon mixture and controls the viscosity such that the physico-chemical properties of the film are improved, said filler being comprised of one or more of natural stone material selected from the group consisting of tourmaline, yellow ocher, sericite, amethyst, bamboo charcoal, obsidian, elvan, and lava; 5-15 wt % of ceramic powder consisting of a far infrared ray-emitting material and an anion-emitting material wherein said far infrared ray-emitting material comprises one or more selected from a group of natural mineral materials such as quartz, monzonite, gneiss and rhyolitic tuff, and said anion-emitting material is one rare-earth natural stone material selected from strontium, vanadium, zirconium, cerium, neodymium, lanthanum, barium, rubidium, cesium and gallium; and 1-2 wt % of pigment which produces color.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
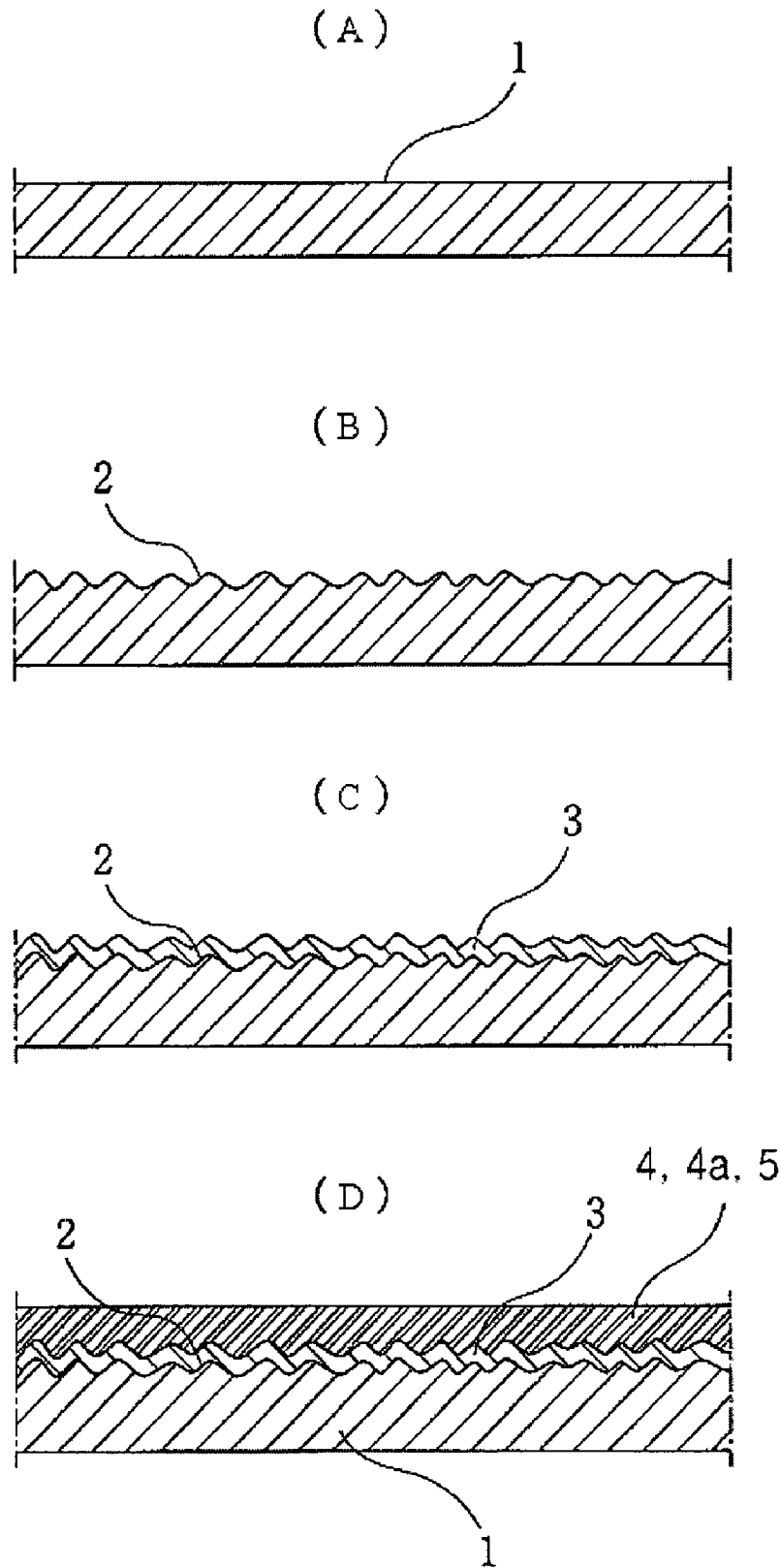
FIG.1 is a diagram showing a process of forming a coating layer on a heat-cooker according to the present invention.

Reference will now be made in detail to the preferred embodiments of the present invention, examples of which are illustrated in the accompanying drawings.

Hereinafter, the coating layer structure for heat-cookers according to the present invention is described in detail with reference to the attached drawings.

An anion- and far infrared ray-emitting, inorganic ceramic coating agent for use in the present invention comprises in admixture the following components: 40-50 wt % of an inorganic binding agent, which is silane such as formula $RnSiX4-n$ or an oligomer derived therefrom, as a binder; 27-34 wt % of a silicon mixture which chemically binds said silane or an oligomer derived therefrom as a binding agent and consists of a mixture of 20-40 wt % of powdered silicon oxide (SiO2) having the particle size of 0.2-1.0 μm and 60-80 wt % of water; 10-19 wt % of a functional filler which prevents the crack of a film between said binding agent and said silicon mixture and controls the viscosity such that the physico-chemical properties of the film are improved; 1-2 wt % of pigment which produces color; and 2-15 wt % of an anion- and far infrared ray-emitting, ceramic powder.

For the above formula RnSiX4-n, one or more silane is used wherein X is the same or different and represents a hydrolysable group or a hydroxyl group, radical R is the same or different and represents hydrogen or an alkyl group having carbon atom number of less than 10, and n is 0, 1 or 2.

Another anion- and far infrared ray-emitting, inorganic ceramic coating agent for use in the present invention comprises in admixture the following components: 65-83 wt % of an inorganic binding agent as a binder wherein said inorganic binding agent consists of 33-47 wt % of methyltrimethoxysilane, 17-23 wt % of tetraethoxysilane and 30-50 wt % of silica sol; 10-19 wt % of a functional filler which prevents the crack of a film between said binding agent and said silicon mixture and controls the viscosity such that the physico-chemical properties of the film are improved; 1-2 wt % of pigment which produces color; and 2-15 wt % of an anion- and far infrared ray-emitting, ceramic powder.

For the functional filler added to said anion- and far infrared ray-emitting, inorganic ceramic coating agent, potassium titanate, alumina, and the like is used and said filler has particles in the form of a needle or a plate, and serves to prevent the crack of a film between the binding agents or to control the viscosity of the coating agent. When such functional filler is added less than 10 wt % relative to the total weight, this may lead to the reduction of gloss or adhesive force, while when it is added more than 19 wt % relative to the total weight, this may, for example, render the surface of the film rough, thereby exhibiting adverse effects. Thus, it is preferred to add the functional filler within the range of 10-19 wt % relative to the total weight.

For the ceramic powder added to said anion- and far infrared ray-emitting, inorganic ceramic coating agent, it is a mixed material which emits anions together with far infrared rays, wherein the far infrared ray-emitting material is a ceramic including one or more selected from a group of natural mineral materials (tourmaline, yellow ocher, sericite, amethyst, bamboo charcoal, obsidian, elvan, and lava, such as quartz, monzonite, gneiss and rhyolitic tuff, the far infrared ray emission rate of which is more than 90% at 40° C. under ambient condition, and the anion-emitting material is one rare-earth natural stone material selected from strontium, vanadium, zirconium (or zirconia), cerium, neodymium, lanthanum, barium, rubidium, cesium and gallium, said materials being already known to emit anions and far infrared rays.

For said ceramic powder, when it is added less than 2 wt %, far infrared ray- and anion-emitting effect is hardly expected, while when it is added more than 15 wt %, this may lead the phase change of the film and reduction of the adhesive force. Thus, the addition of the ceramic powder within the range of 2-15 wt % relative to the total weight can provide a higher anion-emitting effect as well as preventing the phase change of the film while maintaining a strong adhesive force.

For said binding agent which is an inorganic solution, when methyltrimethoxysilane and tetraethoxysilane are added less than the ranges 33-47 wt % and 17-23 wt %, respectively, this may lead reduction of reactivity, while when they are added more than the above ranges, this may lead excessive reaction, thereby deteriorating the properties for a binding agent. Thus, in order to obtain a binding agent having the best properties, methyltrimethoxysilane and tetraethoxysilane should be added within the above ranges.

Also, when the amount of silica sol which is not within the range of 30-50 wt % is added, this may weaken the bonding strength of silicon—oxygen-metal (Si—O-Metal) between methyltrimethoxysilane and tetraethoxysilane, thereby causing delamination at high temperature. Thus, it is preferred to mix silica sol within the above range.

Thus, said anion- and far infrared ray-emitting, inorganic ceramic coating agent for use in the present invention allows relatively lower temperature calcinations at a drying temperature of 200° C. under ambient condition, has an anion emission amount of 800-2,000 per 1 cc air which allows the emission of a large amount of far infrared rays and anions, and further enhances the bonding strength between a binder mixture and ceramic powder when heated to a higher temperature so that no delamination occurs from the substrate. Thus, it has such effects as being hygienically good for the surfaces of metallic or plastic substrates used for home appliances such as general household electronics and cookers, and as being effectively safe to human body.

Also, an inorganic ceramic coating agent having enhanced non-stickness for use in the present invention comprises in admixture the following components: 65-78 wt % of an inorganic solution wherein said inorganic solution comprises in admixture methyltrimethoxysilane, tetraethoxysilane, silica sol and fluorosilane; 10-19 wt % of a functional additive which consists of at least one material of potassium titanate and alumina, which improve the physico-chemical properties of a film and enhance durability, aging resistance and anti-abrasive property, and at least one mineral material selected from tourmaline, yellow ocher, sericite, amethyst, bamboo charcoal, obsidian, elvan, and lava, which emit far infrared rays and anions; 1-2 wt % of pigment which produces color; and 2-15 wt % of silicon oil polymer which is a water-soluble silicon oil and can complement slip property and anti-abrasive property.

Another non-stick, inorganic ceramic coating agent for use in the present invention comprises in admixture the following components: 65-78 wt % of an inorganic solution which is produced by hydrolyzing and polycondensing one or more of silane or an oligomer derived therefrom in the presence of one or more compound selected from the group consisting of silicon oxide particles, oxides hydroxides of alkaline and alkaline-earth metal; 10-19 wt % of a functional filler which improves the physico-chemical properties of a film; 1-2 wt % of pigment which produces color; 0.5-10 wt % of nano-sized titanium oxide which can exert a photocatalyst function; and 2-15 wt % of silicon-based oil polymer which can complement slip property and washing property.

Said inorganic solution consists of 33-47 wt % of methyltrimethoxysilane, 17-23 wt % of tetraethoxysilane and 30-50 wt % of silica sol, wherein when methyltrimethoxysilane and tetraethoxysilane are added less than 33 wt % and 17 wt %, respectively, this may lead the reduction of reactivity, while when they are added more than 47 wt % and 23 wt %, respectively, this may lead excessive reaction, thereby deteriorating the properties for a binding agent. Thus, in order to obtain a binding agent having the best properties, methyltrimethoxysilane and tetraethoxysilane should be added within the above ranges.

When the amount of silica sol which is not within the range of 30-50 wt % is added, it may weaken the bonding strength of silicon—oxygen-metal (Si—O-Metal) between methyltrimethoxysilane and tetraethoxysilane, thereby causing delamination at high temperature. Thus, it is preferred to mix silica sol within the above range.

Said silicon-based oil polymer is added to provide slip property (easy washing) and anti-abrasive property and for example consists of one or more material selected from a water-soluble silicon oil, wherein when it is added less than 2 wt %, the enhancing effect on slip property and anti-abrasive property is minimal, while when it is added more than 15 wt %, this may lead the phase change of the film and reduction of the adhesive force. Thus, the addition of the silicon-based oil polymer within the range of 2-15 wt % relative to the total weight can not only prevent the phase change of the film but also maintain a strong adhesive force.

In order to exert its photocatalyst function, said titanium oxide should have the particle size of 1-100 nm, wherein when it is added less than 0.5 wt % relative to the total weight, no photocatalyst function is observed, while when it is added more than 10 wt %, this may lead economically undesirable result given the very expensive photocatalyst cost. Thus, it is preferred to add said titanium oxide within the range of 0.5-10 wt %.

For said functional additive, potassium titanate or alumina is used to enhance the physico-chemical properties such as durability, aging resistance and anti-abrasive property; or the following materials can be added to provide a special function: one or more far infrared ray-emitting mineral material selected from a group of natural mineral materials such as quartz, monzonite, gneiss and rhyolitic tuff; or far infrared ray- and anion-emitting mineral material consisting of either one or more natural stone material selected from tourmaline, yellow ocher, sericite, amethyst, Sanggwangsuk*, bamboo charcoal, Uiwangsuk*, kiyoseki, obsidian, elvan, Kwangmyeongsuk*, lava and Kwisinsuk* (*means Korean-to-English transliteration) or one or more charcoal material selected from seaweed charcoal and hard wood charcoal. These materials have the particles in the form of a needle or a plate, and serve to prevent the crack of the film between the binding agents and to control the viscosity of the coating agent.

For said functional additive, when it is added less than 10 wt %, this may lead to reduction of gloss or adhesive force, while when it is added more than 19 wt %, this may, for example, render the surface of the film rough, thereby exhibiting adverse effects. Thus, it is preferred to add the functional additive within the range of 10-19 wt %.

The above-mentioned non-stick, inorganic ceramic coating agent for use in the present invention acts to form an inorganic film, in which an inorganic binder is combined with effective materials which show non-stickness and easy washing ability, on the surfaces of metallic or plastic substrates used for home appliances such as general household electronics and cookers, is hygienically good and non-toxic to human body. Also, such coating agent can meet the properties required for the resulting product by enhancing non-stickness and easy washing ability, allows relatively lower temperature calcinations at a drying temperature of 120-160° C., and enables a variety of color to be expressed, thereby exhibiting the effect of enhancing the quality of the product.

Figure 2:
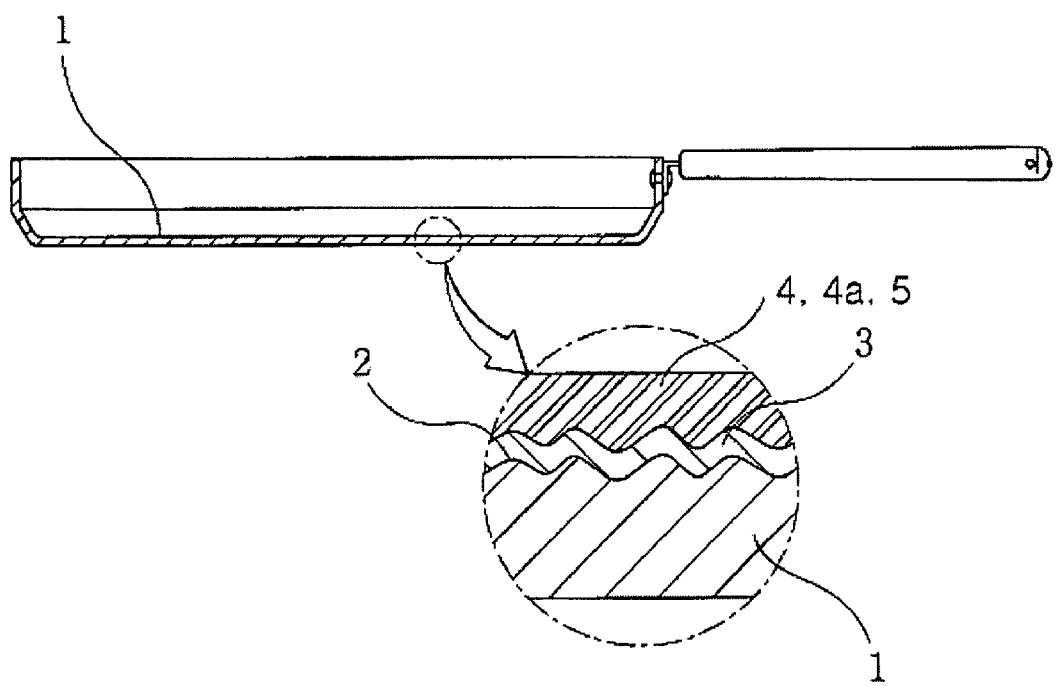
FIG.2 is a sectional view of a heat-cooker according to the present invention.

A process of forming a coating layer structure of a heat-cooker using the anion- and far infrared ray-emitting, inorganic ceramic coating agent and the non-stick, inorganic ceramic coating agent according to the present invention, will be described in detail with reference to the following Examples illustrated by the accompanying drawings in which FIG. 1 is a diagram showing the process of forming a coating layer on a heat-cooker and FIG. 2 is a sectional view of a heat-cooker according to the present invention.

EXAMPLE 1

Initially, a roughness-forming step is carried out to increase the surface area to which aluminum oxide to be subsequently deposited is firmly adhered, said step comprising subjecting the inner surface of a body (1) of an aluminum heat-cooker as shown in FIG. 1(*a*) to sandblasting so that a fine corrugated pattern (2) is formed on the inner surface of the body (1) as shown in FIG. 1(*b*) and surface roughness is created.

After said roughness-forming step is completed, a washing and drying step is carried out to remove contaminants due to sandblastering.

After said washing and drying step is completed, a step of forming an aluminum oxide film layer is carried out to form a robust aluminum oxide film layer (3), which has enhanced anti-corrosive and anti-abrasive properties, as shown in FIG. 1(*c*), said step comprising subjecting the entire corrugated pattern (2) formed on the inner surface of the body (1) of a heat-cooker to anodizing (anodic oxidation) using oxalic acid, sulfuric acid, chromic acid, and the like.

After said step of forming an aluminum oxide film layer is completed, a step of applying a ceramic coating agent is carried out to apply an anion- and far infrared ray-emitting inorganic ceramic coating agent as shown in FIG. 1(*d*), wherein said coating agent comprises in admixture the following components: 40-50 wt % of a binding agent, which is silane or an oligomer derived therefrom, as a binder; 27-34 wt % of a silicon mixture which chemically binds said silane or an oligomer derived therefrom as a binding agent and consists of a mixture of 20-40 wt % of powdered silicon oxide having the particle size of 0.1-1.2 µm and 60-80 wt % of water; 10-19 wt % of powdered functional filler which prevents the crack of a film between said binding agent and said silicon mixture and controls the viscosity such that the physico-chemical properties of the film are improved, said filler being comprised of one or more of natural stone material selected from the group consisting of tourmaline, yellow ocher, sericite, amethyst, bamboo charcoal, obsidian, elvan, and lava; 5-15 wt % of ceramic powder consisting of a far infrared ray-emitting material and an anion-emitting material wherein said far infrared ray-emitting material comprises one or more selected from a group of natural mineral materials such as quartz, monzonite, gneiss and rhyolitic tuff, and said anion-emitting material is one rare-earth natural stone material selected from strontium, vanadium, zirconium, cerium, neodymium, lanthanum, barium, rubidium, cesium and gallium; and 1-2 wt % of pigment which produces color.

After said step of applying a ceramic coating agent is completed, a step of drying at 120-160° C. for 1 to 2 hours is carried out to form an anion- and far infrared ray-emitting inorganic ceramic coating layer (4) on the aluminum oxide film layer (3) in a stack manner as shown in FIG. 1(*d*).

For the above-described heat-cooker, in which the aluminum oxide film layer (3) and the anion- and far infrared ray-emitting, inorganic ceramic coating layer (4) are sequentially stacked, the following advantages are achieved: since the bonding strength of the inorganic ceramic coating layer (4) to the body (1) is enhanced by the aluminum oxide film layer (3), no abrasions and scratches occur even when a spoon or a metallic spatula, and the like is used and thus the shelf-life of said cooker can be extended; said cooker is non-toxic to human body; and said cooker has a good heat conductivity such that food is evenly cooked.

EXAMPLE 2

Initially, a roughness-forming step is carried out to increase the surface area to which aluminum oxide to be subsequently deposited is firmly adhered, said step comprising subjecting the inner surface of a body (1) of an aluminum heat-cooker as shown in FIG. 1(a) to sandblastering so that a fine corrugated pattern (2) is formed on the inner surface of the body (1) as shown in FIG. 1(b) and surface roughness is created.

After said roughness-forming step is completed, a washing and drying step is carried out to remove contaminants due to sandblastering.

After said washing and drying step is completed, a step of forming an aluminum oxide film layer is carried out to form a robust aluminum oxide film layer (3), which has enhanced anti-corrosive and anti-abrasive properties, as shown in FIG. 1(c), said step comprising subjecting the entire corrugated pattern (2) formed on the inner surface of the body (1) of a heat-cooker to anodizing (anodic oxidation) using oxalic acid, sulfuric acid, chromic acid, and the like.

After said step of forming an aluminum oxide film layer is completed, a step of applying a ceramic coating agent is carried out to apply an anion- and far infrared ray-emitting, inorganic ceramic coating agent as shown in FIG. 1(d), wherein said coating agent comprises in admixture the following components: 65-83 wt % of an inorganic binding agent as a binder wherein said inorganic binding agent consists of 33-47 wt % of methyltrimethoxysilane, 17-23 wt % of tetraethoxysilane and 30-50 wt % of silica sol; 10-19 wt % of a functional filler which prevents the crack of a film between said binding agent and said silicon mixture and controls the viscosity such that the physico-chemical properties of the film are improved; 1-2 wt % of pigment which produces color; and 2-15 wt % of an anion- and far infrared ray-emitting, ceramic powder.

After said step of applying a ceramic coating agent is completed, a step of drying at 120-160° C. for 1 to 2 hours is carried out to form an anion- and far infrared ray-emitting inorganic ceramic coating layer (4a) on the aluminum oxide film layer (3) in a stack manner as shown in FIG. 1(d).

For the above-described heat-cooker, in which the aluminum oxide film layer (3) and the anion- and far infrared ray-emitting, inorganic ceramic coating layer (4a) are sequentially stacked, the following advantages are achieved: since the bonding strength of the inorganic ceramic coating layer (4a) to the body (1) is enhanced by the aluminum oxide film layer (3), no abrasions and scratches occur even when a spoon or a metallic spatula, and the like is used and thus the shelf-life of said cooker can be extended; said cooker is non-toxic to human body; and said cooker has a good heat conductivity such that food is evenly cooked.

EXAMPLE 3

Initially, a roughness-forming step is carried out to increase the surface area to which aluminum oxide to be subsequently deposited is firmly adhered, said step comprising subjecting the inner surface of a body (1) of an aluminum heat-cooker as shown in FIG. 1(a) to sandblastering so that a fine corrugated pattern (2) is formed on the inner surface of the body (1) as shown in FIG. 1(b) and surface roughness is created.

After said roughness-forming step is completed, a washing and drying step is carried out to remove contaminants due to sandblastering.

After said washing and drying step is completed, a step of forming an aluminum oxide film layer is carried out to form a robust aluminum oxide film layer (3), which has enhanced anti-corrosive and anti-abrasive properties, as shown in FIG. 1(c), said step comprising subjecting the entire corrugated pattern (2) formed on the inner surface of the body (1) of a heat-cooker to anodizing (anodic oxidation) using oxalic acid, sulfuric acid, chromic acid, and the like.

After said step of forming an aluminum oxide film layer is completed, a step of applying a ceramic coating agent is carried out to apply an inorganic ceramic coating agent having enhanced non-stickness and easy washing ability as shown in FIG. 1(d), wherein said coating agent comprises in admixture the following components: 65-78 wt % of an inorganic solution which is produced by hydrolyzing and polycondensing one or more of silane or an oligomer derived therefrom in the presence of one or more compound selected from the group consisting of silicon oxide particles, oxides hydroxides of alkaline and alkaline-earth metal; 10-19 wt % of a functional filler which improves the physico-chemical properties of a film; 1-2 wt % of pigment which produces color; 0.5-10 wt % of nano-sized titanium oxide which can exert a photocatalyst function; and 2-15 wt % of silicon-based oil polymer which can complement slip property and washing property.

After said step of applying a ceramic coating agent is completed, a step of drying at 120-160° C. for 1 to 2 hours is carried out to form an inorganic ceramic coating layer (5) having enhanced non-stickness and easy washing ability on the aluminum oxide film layer (3) in a stack manner as shown in FIG. 1(d)

For the above-described heat-cooker, in which the aluminum oxide film layer (3) and the inorganic ceramic coating layer (5) having enhanced non-stickness and easy washing ability are sequentially stacked, the following advantages are achieved: since the bonding strength of the inorganic ceramic coating layer (5) to the body (1) is enhanced by the aluminum oxide film layer (3), no abrasions and scratches occur even when a spoon or a metallic spatula, and the like is used and thus the shelf-life of said cooker can be extended; said cooker is non-toxic to human body; and said cooker has a good heat conductivity such that food is evenly cooked.

As described hereinbefore, according to the present invention, an improved heat-cooker is provided, wherein it is non-toxic to human body, has a good heat conductivity such that food is evenly cooked, and has an extremely strong surface strength such that even when a spoon or a metallic spatula, and the like is used, no abrasions and scratches occur and thus the shelf-life of said cooker can be extended and wherein said improvements are achieved by forming an aluminum oxide film layer on the surface of an aluminum cooker by anodic oxidation, and then applying thereon an anion- and far infrared ray-emitting, environmentally-friendly, inorganic ceramic coating agent or a non-stick, inorganic ceramic coating agent.

The description of the invention set forth herein is illustrative, and is not intended to limit the scope of the invention as set forth in the following claims. For example, while specific speed sensing circuits have been described, the individual components may vary. Other variations and modifications of the embodiments disclosed herein, may be made based on the description set forth herein, without departing from the scope and spirit of the invention as set forth in the following claims.

What is claimed is:

1. A coating layer structure for aluminum heat-cookers having a corrugated pattern (2) formed on an inner surface of a body (1) of said cookers wherein an aluminum oxide layer (3) is formed on said corrugated pattern by anodic oxidation, characterized in that said structure has an anion and far infrared ray-emitting inorganic ceramic coating layer (4) formed on said aluminum oxide layer (3), wherein said inorganic ceramic coating layer (4) comprises in admixture the following components:

40-50 wt % of a binding agent, which is silane or an oligomer derived therefrom, as a binder;

27-34 wt % of a silicon mixture which chemically binds said silane or an oligomer derived therefrom as a binding agent and consists of a mixture of 20-40 wt % of powdered silicon oxide having a particle size of 0.1-1.0 μm and 60-80 wt % of water;

10-19 wt % of powdered functional filler which prevents the crack of a film between said binding agent and said silicon mixture and controls the viscosity such that the physico-chemical properties of the film are improved, said filler being comprised of one or more of natural stone material selected from the group consisting of tourmaline, yellow ocher, sericite, amethyst, bamboo charcoal, obsidian, elvan and lava;

5-15 wt % of ceramic powder consisting of a far infrared ray-emitting material and an anion-emitting material wherein said far infrared ray-emitting material comprises one or more natural mineral materials selected from the group consisting of quartz, monzonite, gneiss and rhyolitic tuff, and said anion-emitting material is one stone material selected from the group consisting of strontium, vanadium, zirconium, cerium, neodymium, lanthanum, barium, rubidium, cesium and gallium; and 1-2 wt % of pigment which produces color.

2. A coating layer structure for aluminum heat-cookers having a corrugated pattern (2) formed on an inner surface of a body (1) of said cookers wherein an aluminum oxide layer (3) is formed on said corrugated pattern by anodic oxidation, characterized in that said structure has a non-stick, inorganic ceramic coating layer (5) formed on said aluminum oxide layer (3), wherein said inorganic ceramic coating layer (5) comprises in admixture the following components:

65-78 wt % of an inorganic solution which is produced by hydrolyzing and polycondensing one or more of silane or an oligomer derived therefrom in the presence of one or more compound selected from the group consisting of silicon oxide particles, oxides, hydroxides of alkaline and alkaline-earth metal;

10-19 wt % of a functional filler which improves the physico-chemical properties of a film; 1-2 wt % of pigment which produces color;

0.5-10 wt % of nano-sized titanium oxide having nano-size which can exert a photocatalyst function; and 2-15 wt % of silicon-based oil polymer which can complement slip property and washing property.

* * * * *